(12) United States Patent
Praus et al.

(10) Patent No.: US 7,813,858 B2
(45) Date of Patent: Oct. 12, 2010

(54) METHOD AND DEVICE FOR CONTROLLING THE SLIP OF A VEHICLE CLUTCH

(75) Inventors: Rainer Praus, Ottersweier (DE); Olaf Werner, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/638,623

(22) Filed: Dec. 15, 2009

(65) Prior Publication Data

US 2010/0094518 A1   Apr. 15, 2010

Related U.S. Application Data

(63) Continuation of application No. PCT/DE2008/001077, filed on Jun. 26, 2008.

(30) Foreign Application Priority Data

Jul. 5, 2007   (DE) ...................... 10 2007 031 389

(51) Int. Cl.
*F16D 48/06* (2006.01)
*G06F 19/00* (2006.01)

(52) U.S. Cl. .............................. 701/68; 701/82; 701/87
(58) Field of Classification Search ................... 701/68, 701/67, 82, 51, 54, 62, 87, 90, 91, 55, 102; 477/107

See application file for complete search history.

(56) References Cited

U.S. PATENT DOCUMENTS

| 5,778,329 | A | * | 7/1998 | Officer et al. .................. 701/55 |
| 6,167,340 | A | | 12/2000 | Cui et al. |
| 2005/0189192 | A1 | | 9/2005 | Serebrennikov |
| 2008/0262695 | A1 | * | 10/2008 | Gibson et al. ............... 701/102 |

FOREIGN PATENT DOCUMENTS

| DE | 4011850 | 10/1990 |
| EP | 1496280 A2 | 1/2005 |
| WO | 03100279 | 12/2003 |

* cited by examiner

*Primary Examiner*—Tan Q Nguyen
(74) *Attorney, Agent, or Firm*—Simpson & Simpson, PLLC

(57) ABSTRACT

A method for controlling the slip of a vehicle clutch, wherein in the method the difference between a speed signal of the drive-end input shaft of the clutch and a filtered speed signal of a transmission-end clutch output shaft are maintained at a desired value.

10 Claims, 6 Drawing Sheets

METHOD AND DEVICE FOR CONTROLLING THE SLIP OF A VEHICLE CLUTCH

CROSS-REFERENCE TO RELATED APPLICATIONS

This application is filed under 35 U.S.C. §120 and §365(c) as a continuation of International Patent Application PCT/DE2008/001077, filed Jun. 26, 2008, which application claims priority from German Patent Application No. 10 2007 031 389.8, filed Jul. 5, 2007, which applications are incorporated herein by reference in their entireties.

FIELD OF THE INVENTION

The invention relates to a method and device for controlling the slip of a vehicle clutch, wherein the difference between a rotary signal of a clutch input shaft on the drive end and a filtered rotational speed signal of a transmission end output shaft of clutch 12 is maintained at a desired value.

BACKGROUND OF THE INVENTION

In modern motor vehicles, particularly passenger motor vehicles, automated couplings are used increasingly.

By using such clutches not only in connection with automated gearshift transmissions but also with manually operated gearshift transmissions, one has the advantage of improved driving comfort, as shown by experience, particularly in connection with automated gearshift transmissions; a further advantage is that one drives more frequently in gears with long transmission ratios, thus reducing fuel consumption and environmental pollution. FIG. 1 shows the design of a vehicle drive train with a common automated clutch.

Engine 10 is connected via the clutch 12 with manual shift transmission 14 that in the depicted example is connected via cardan shaft 16 with differential unit 18 again connected via cardan shaft 20 with rear wheels 22.

It is obvious that the drive train could be used for a vehicle with front drive or all-wheel drive.

Clutch 12 is actuated by an actuating device and/or actuator 24. Manual-shift transmission 14 involves, for instance, an automated manual-shift transmission that is actuated by actuating device 26. Selection unit 28 is provided for operating the transmission with which different driving programs or gears can be selected. Accelerator pedal 30 connected directly or via control unit 32, or via a control device with power adjustment element 34 of engine 10 is used to control the load of engine 10. Control unit 32 is connected to sensors such as sensor 36 for acquiring the rotation speed of a flywheel of engine 10 or an input shaft of clutch 12, sensor 38 for acquiring the rotation speed of a clutch disc—not depicted—which is connected non-rotatably with an output shaft of the clutch or an input shaft of transmission 14, rotation speed sensors 40 for acquiring the wheel rotation speeds as well as other sensors, for instance a coolant temperature sensor, a sensor for acquiring the position of power adjustment element 34, a sensor for acquiring the position of the clutch etc. The programs with which actuating device 26, the actuator 24, and actuator for power adjustment element 34 are controlled are stored in a familiar manner in control unit 32, which contains a microprocessor with associated storage devices. Design and function of individually illustrated assemblies and their interaction are in fact familiar and therefore not explained in detail.

A method and an apparatus is disclosed in DE 103 23 567 A1; this serves the modulation of torque capable of clutch transmission, in particular during the coupling of clutch when starting the vehicle, and thus correcting chatter oscillations. In doing so, the torque is modulated in dependence upon a filtered variable derived only from the rotation speed signal of the clutch disc or transmission input shaft. The filtered variable is calculated by smoothing the rotation speed signal of the transmission input shaft a multiple times versus a time duration, which is equal to the duration of chatter vibration, as well as by multiplication with a correction factor.

In order to decouple the vehicle's drive train from engine-excited oscillation, work is underway to operate an automated clutch with slight slip in certain rotation speed ranges.

Isolation reached by slip can considerably enhance comfort. At the same time, the differential rotation speed at the clutch must be set accurately. Too large a speed difference leads to increased energy input and lining wear; too small a speed difference can lead to a sticking clutch and hence reduced comfort. In the usual approach, trial is made to adjust the speed difference by means of a control system in that the transmittable clutch torque is modulated. To calculate the slip, differential is established between the engine speed or the clutch input shaft speed and the transmission input speed or the clutch output shaft speed. To avoid feedforward of drive train oscillations by the controller, particularly chatter oscillations, it is necessary to eliminate the chatter oscillations most extensively from the transmission input speed. A pure PT1-filter is unsuitable for this purpose, since this filter only achieves sufficient smoothing of the transmission speed only at the expense of too large a phase angle between the engine and the transmission speed. The invention is based on the task to provide a method and a device for controlling the slip of a clutch, with the one or the other demands particularly with respect to filtration of the speed signal of the transmission input speed sensor:

Chatter oscillations with typical chatter frequency for the respectively selected gear must be suppressed; the filtered speed signal at constant acceleration should be similar to a PT1-filter, after finite time it should have a slight, adjustable phase position relative to the engine speed; during load change and gearshift, overshoot and undershoot should appear as little as possible.

BRIEF SUMMARY OF THE INVENTION

The present invention broadly comprises a method for controlling the slip of a vehicle clutch, wherein the difference between the speed signal of the drive-end clutch input shaft and a filtered speed signal of the transmission-end clutch output shaft are kept at a desired value, by carrying out the following steps:

a) from a corresponding raw signal n_raw of an instantaneous speed of the transmission-end clutch output shaft, a sliding average value n_ma is calculated, of which an average range of N interrupts is adapted to a chatter frequency 1/T for a respective gear;

b) from the sliding average value n_ma calculated in the course of the interrupt and from an average value n_ma_old in the previous interrupt, a derivative of the sliding average value n_dot is calculated;

c) from the calculated derivative of the sliding average value n_dot and from a calculated smoothed derivative of the decimal signal n_dot_filt_old, the speed signal n_dot_filt is calculated with a smoothed PT1-filter;

d) from a calculated, filtered speed signal n_filt_old and from the smoothed derivative of the straightened derivative n_dot_filt, a predicted speed signal n_pred for the current interrupt is calculated;

e) from the raw signal n_raw and the filtered speed signal n_filt_old in the previous interrupt, a weighted average value n_PT1 is calculated; and f) from the weighted average value n_PT1 and from the predicted speed signal n_pred, the filtered speed signal n_filt is calculated.

Advantageously, the derivative n_dot is calculated according to the following formula: n_dot=(n_ma−n_ma_old)/Δt, wherein Δt=T/N is the interrupt length.

Advantageously, the smoothed derivative n_dot_filt is calculated according to the following formula: n_dot_filt= (p2*n_dot+(100−p2)*n_dot_filt_old)/100, wherein p2 is a weighting factor.

Advantageously, the predicted speed n_pred is calculated according to the following formula: n_pred=n_filt_old*+ n_dot_filt*Δt.

Advantageously, the weighted average value n_PT1 is calculated according to the following formula: n_PT1= (p1*n_raw*f_n+(100−p1)*n_filt_old)/100, wherein p1 is a weighting factor.

Advantageously, the filtered speed n_filt is calculated according to the following formula: n_filt=(p3*n_pred+ (100−p3)*n_PT1)/100, wherein p3 is a weighting factor.

Advantageously, the weighting factor p3 can be set at zero in a method according to the invention, when the difference between raw signal n_raw and filtered speed signal n_filt exceeds a limit value for a time duration longer than the period T of the chatter frequency.

Advantageously, in a method according to the invention, after setting the value from p3 at zero, p3 can be raised in each interrupt by a fixed amount by means of a ramp until the original value of p3 is attained again.

Preferably, in a method according to the invention the speed signal of the drive-end input shaft of the clutch can be supplied by an electronic engine control device.

The part of the inventive task relating to the apparatus is solved with an apparatus that features a sensor for generating a raw signal n_raw corresponding to the instantaneous speed of the output shaft and an electronic control device having an input connected with the sensor, and a further speed signal input of the clutch input shaft, wherein the electronic control device controls the slip of the clutch according to the above-described method.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 2:
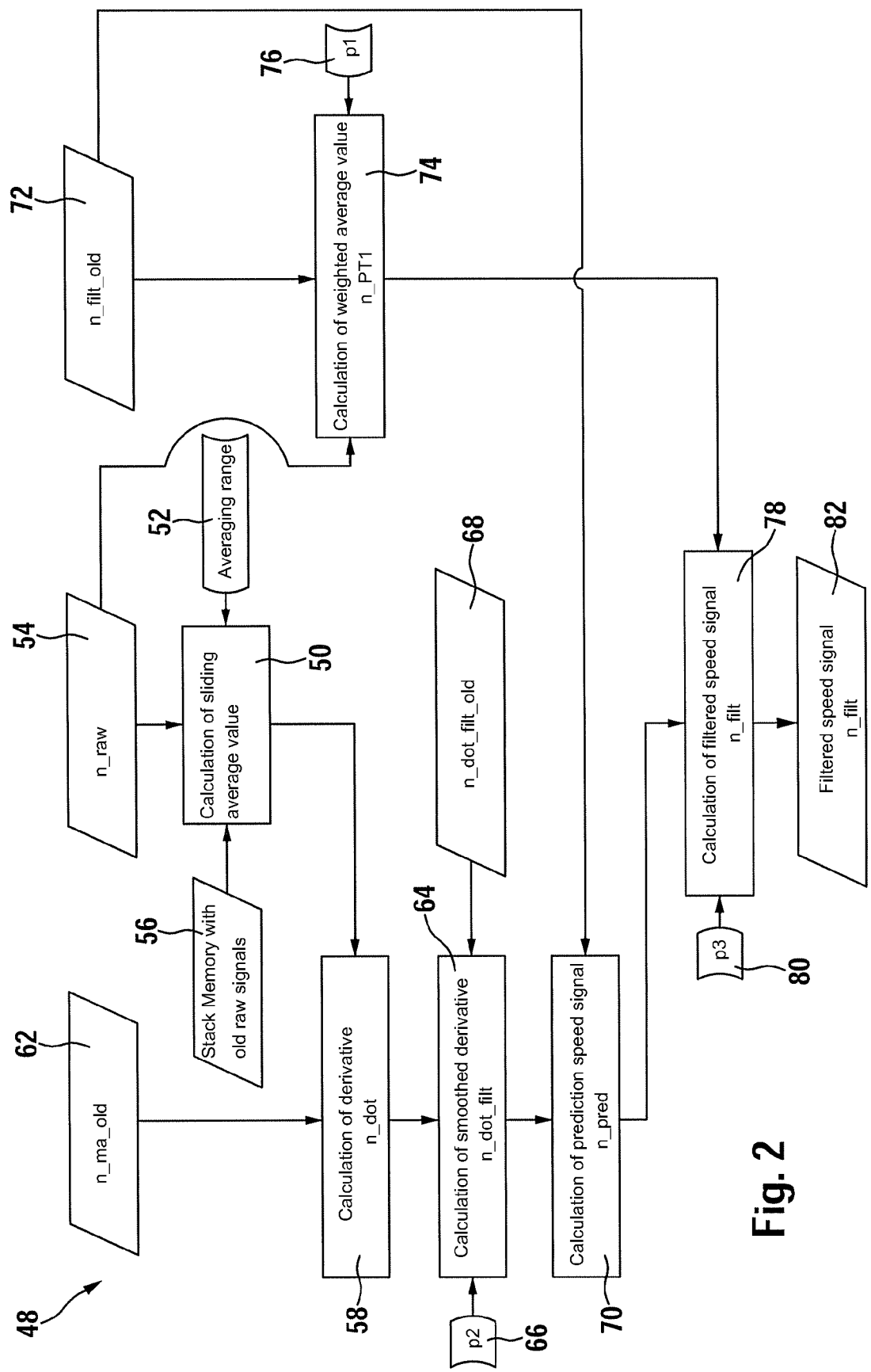
FIG. 2 is a flowchart for illustrating the method according to the invention; and, FIGS. 3 to 6 show different filtering concepts of a raw signal according to the current invention.

In FIG. 2, the boxes drawn as parallelogram designate data memory; the boxes drawn as rectangles designate calculation or process steps; laterally along the process, the steps are parameters that flow into the calculation.

Figure 1:
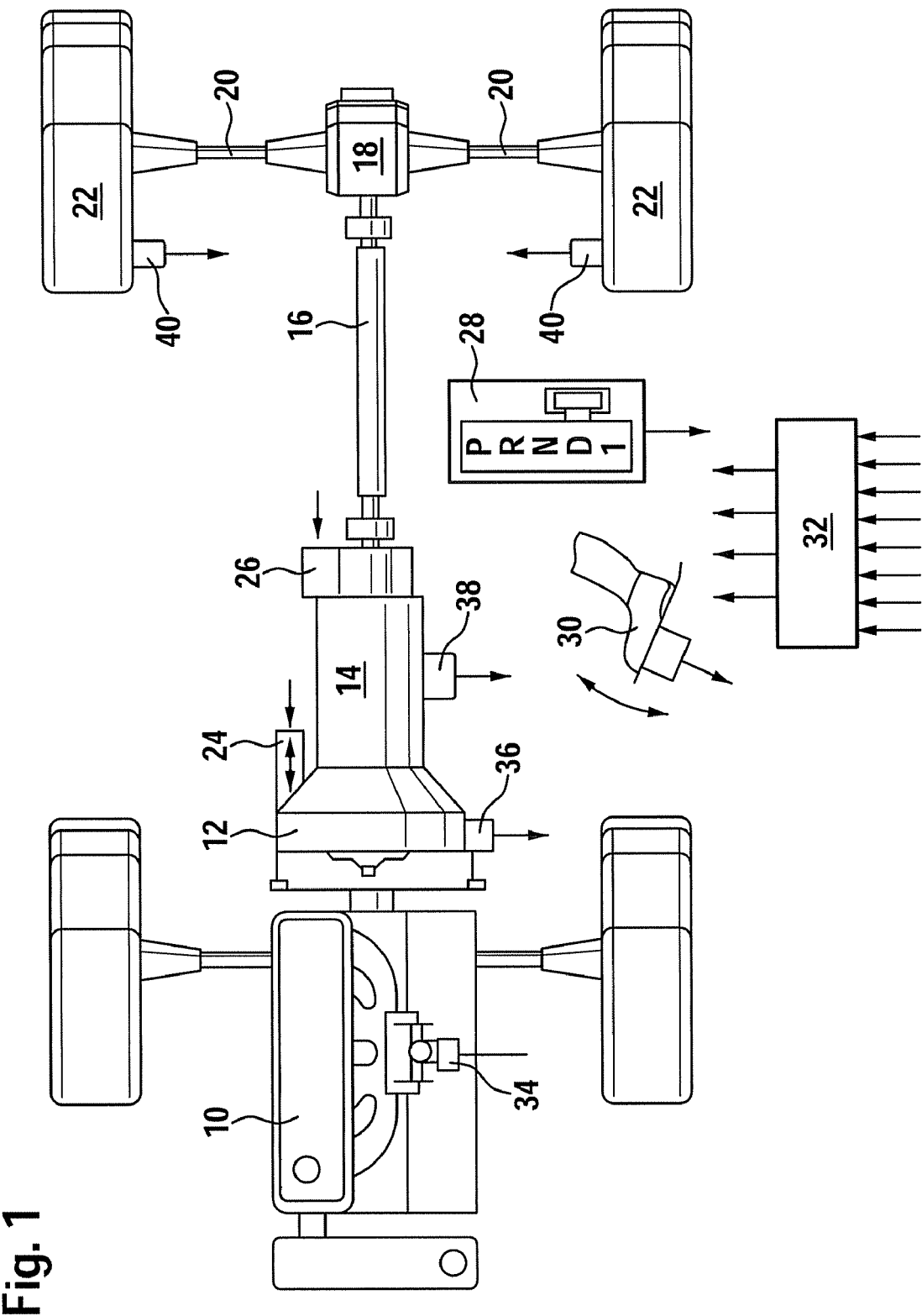
FIG. 1 schematically illustrates a common drive train.

Clutch 12 from FIG. 1 is activated via actuator 24 such that predetermined clutch slip prevails, which can depend upon the operational parameters of the drive train, for instance engine speed, position of accelerator pedal 30, vehicle speed, selected driving program etc. The clutch slip is defined as the differential between the speed of engine 10 or of clutch input shaft 12 and the speed of clutch output shaft 12 or transmission input shaft 14. A signal corresponding to the engine speed, for instance, can be input directly from a control unit. This is advantageous, in that, engine-speed signal is already smoothed and does not contain non-uniform rotation. With respect to the speed of the transmission input shaft, a raw signal n_raw is generated by sensor 38, which corresponds to the instantaneous speed of the transmission input shaft, during a period of Δt. It is generated, for instance, in that the number of teeth that bypass a magnet during the period Δt is counted and the instantaneous speed is calculated from the circumferential angle through which the teeth extend and the period Δt as a raw signal. This instantaneous speed is frequently beset with strong fluctuations, for instance, as a result of chatter oscillations, so that the respective signal n_raw generated by sensor 38 is processed according to the invention based on flow diagram 48 from FIG. 2 in order to be suitable for the slip control.

In first process step 50, a sliding average value n_ma is calculated from the current raw signal n_raw in a known manner, whereby averaging range 52 of N interrupts is tuned exactly to the desired or existing chatter frequency for the respective gear, i.e., when the duration of a chatter oscillation is T and a raw signal n_raw during a period Δt (=interrupt length, for instance, 0.01 s) is constant, then it follows that N=T/Δt, wherein N is the number of interrupts within a chatter oscillation. This averaging thus suppresses exactly a period of an oscillation. The current raw signal n_raw is derived from memory 54. Stack memory 56 contains at least the number N of initially determined raw signals.

In second process step 58 the derivative of a speed signal n_dot calculated from the sliding average value n_ma in the current interrupt and the sliding average value n_ma_old calculated from an interrupt in the previous interrupt is calculated according to the following formula: n_dot=(n_ma− n_ma_old)/Δt.

The value n_ma_old is derived from memory 62. At constant acceleration, the calculated derivative is constant at the latest after N interrupts, i.e., the first demand mentioned above is fulfilled, thus, typical chatter oscillation is suppressed.

In third process step 64, a smoothed derivative of the speed signal n_dot_filt is calculated from the derivative of the speed signal n_dot and from a smoothed derivative of the speed signal n_dot_filt_old with a PT1-filter calculated in the previous interrupt:

$$n\_dot\_filt=(p2*n\_dot+(100-p2)*n\_dot\_filt\_old)/100.$$

The factor p2 designated with 66 is a weighting factor in [%]. The factor p2 influences the overshoot behavior under load cycles. Large values of p2 lead to smaller overshoots; smaller values lead to greater overshoots. The preferred value range of p2 lies between 4 and 9. A typical value lies at 6.

The value n_dot_filt_old is derived from memory 68.

In a forth process step 70 a predicted speed signal n_pred for the current interrupt from a filtered speed signal n_filt_old is calculated in the previous interrupt and from the smoothed derivative n_dot_filt is calculated according to the following formula:

$$n\_pred=n\_filt\_old*+n\_dot\_filt*\Delta t.$$

The value n_filt_old is derived from memory 72.

At constant acceleration, the calculated predicted speed signal behaves as PT1-filtration and delivers a constant time-delay relative to the raw signal, through which, after a finite time, a small phase position capable of permanent setting for the engine speed signal is attained. Thus, also this above-mentioned demand is fulfilled.

In fifth process step 74 a weighted average value n_PT1 from the raw signal n_raw and of the filtered speed signal n_filt_old in the previous interrupt is calculated according to the following formula: n_PT1=(p1*n_raw*f_n+(100-p1)*n_filt_old)/100.

The factor p1 from 76 is a weighting factor in [%]. The factor p1 determines the PT1-type time delay of the filtered speed at constant acceleration. Large values of p1 lead to a shorter delay, smaller values cause a longer delay. The value of p1 lies advantageously between 20 and 100. A typical value amounts to 33.

The value n_filt_old is derived from memory 72; the current raw signal n_raw is derived from memory 54. This averaging corresponds to a PT1-filter that causes a constant time delay between a raw signal and a filtered signal.

In sixth process step 78 a filtered speed signal n_filt is calculated as a weighted average from the weighted average value n_PT1 and from the predicted speed signal n_pred according to the following formula: n_filt=(p3*n_pred+(100-p3)*n_PT1)/100.

The factor p3 designated with 80 is a weighting factor in [%]. The factor p3 influences the overshoot behavior during load cycles as well as the rest amplitudes when chatter oscillations are not filtered out accurately. Larger values of p3 lead to broader overshoots, with a smaller amplitude. Smaller values of p3 lead to narrower overshoots, with a larger amplitude. The values of p3, for instance, lie between 85 and 95. A typical value is 90.

Value n_filt is always stored in memory 82 and during the next passage of flow diagram 48, analogous to n_ma_old and n_dot_filt_old, it is written on n_filt_old. n_filt is the filtered speed signal, which is used for the slip control of clutch 12.

Figure 3:
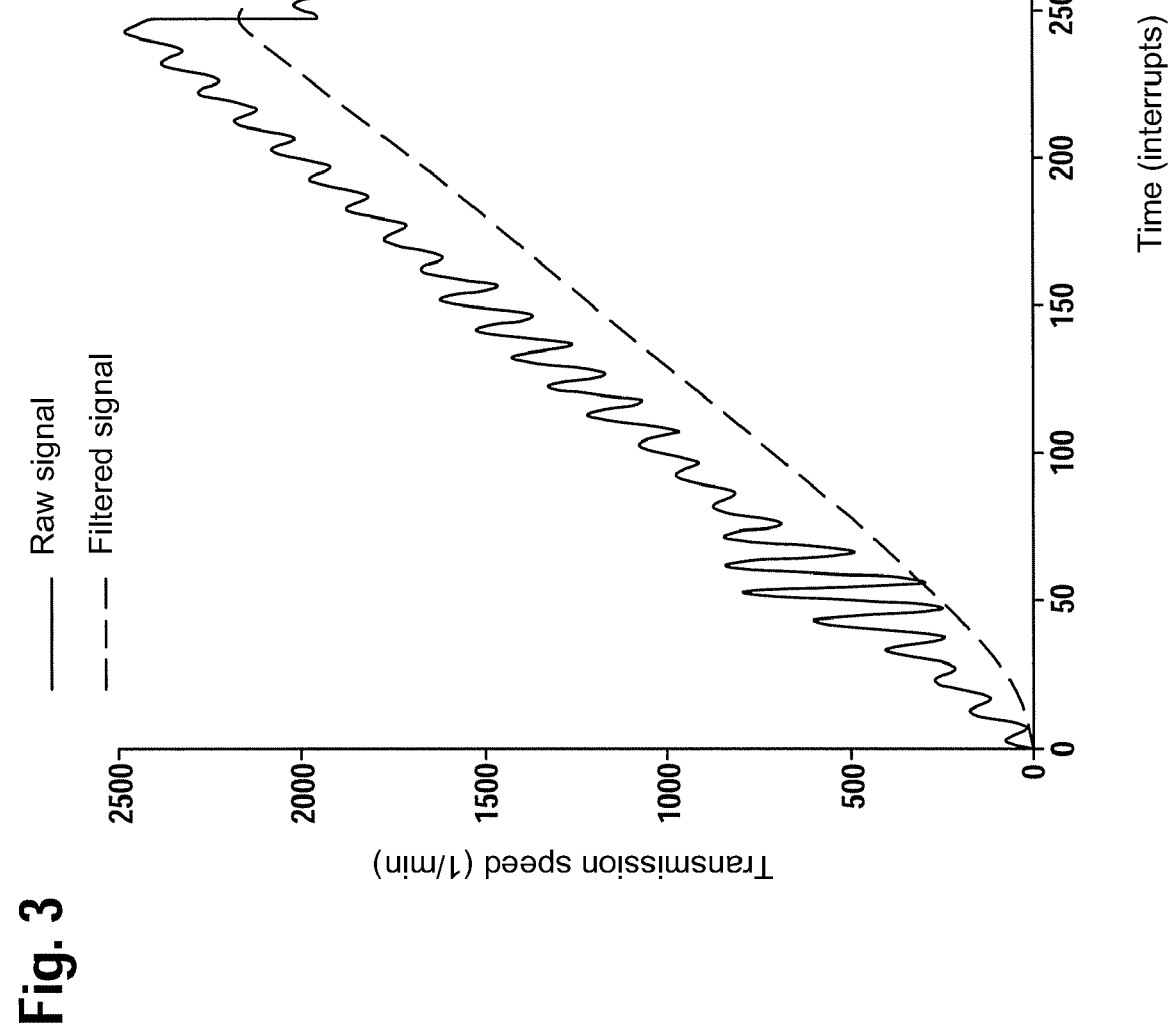
Figure 4:
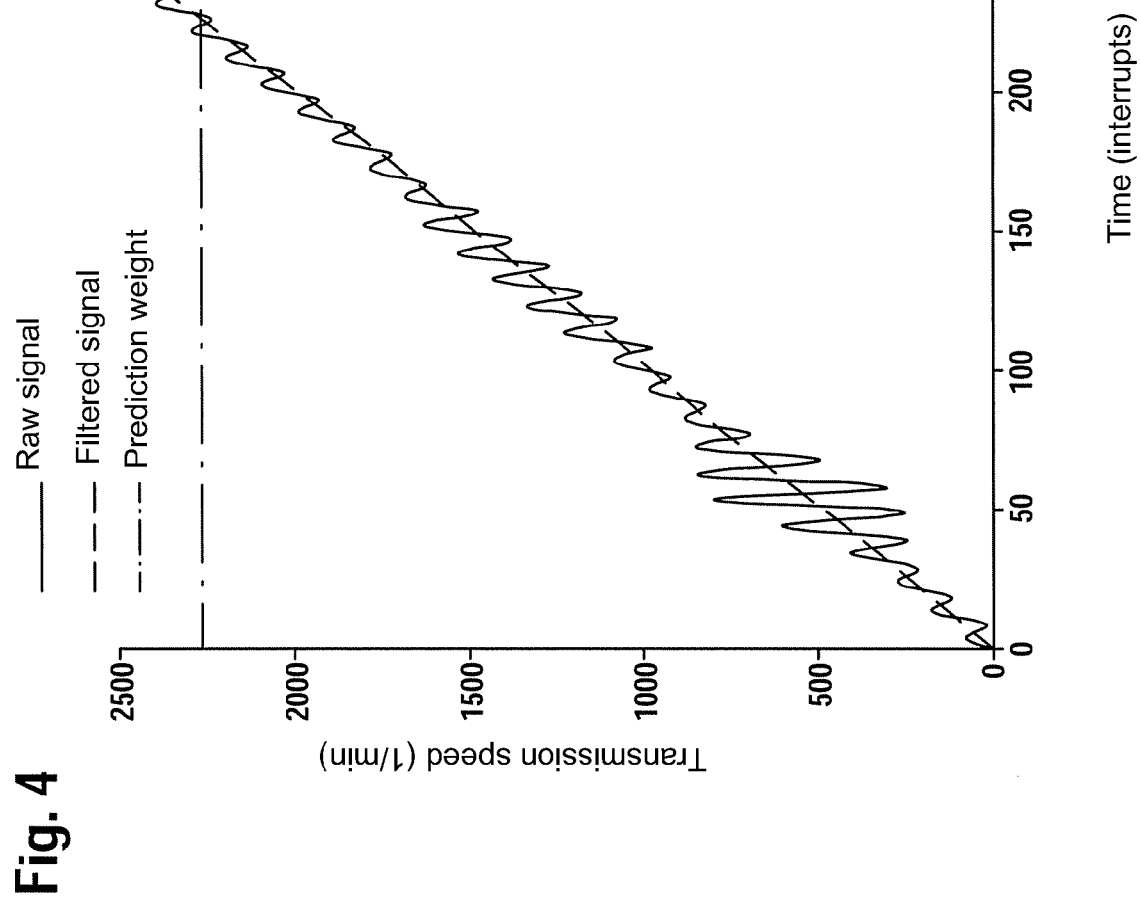
Figure 5:
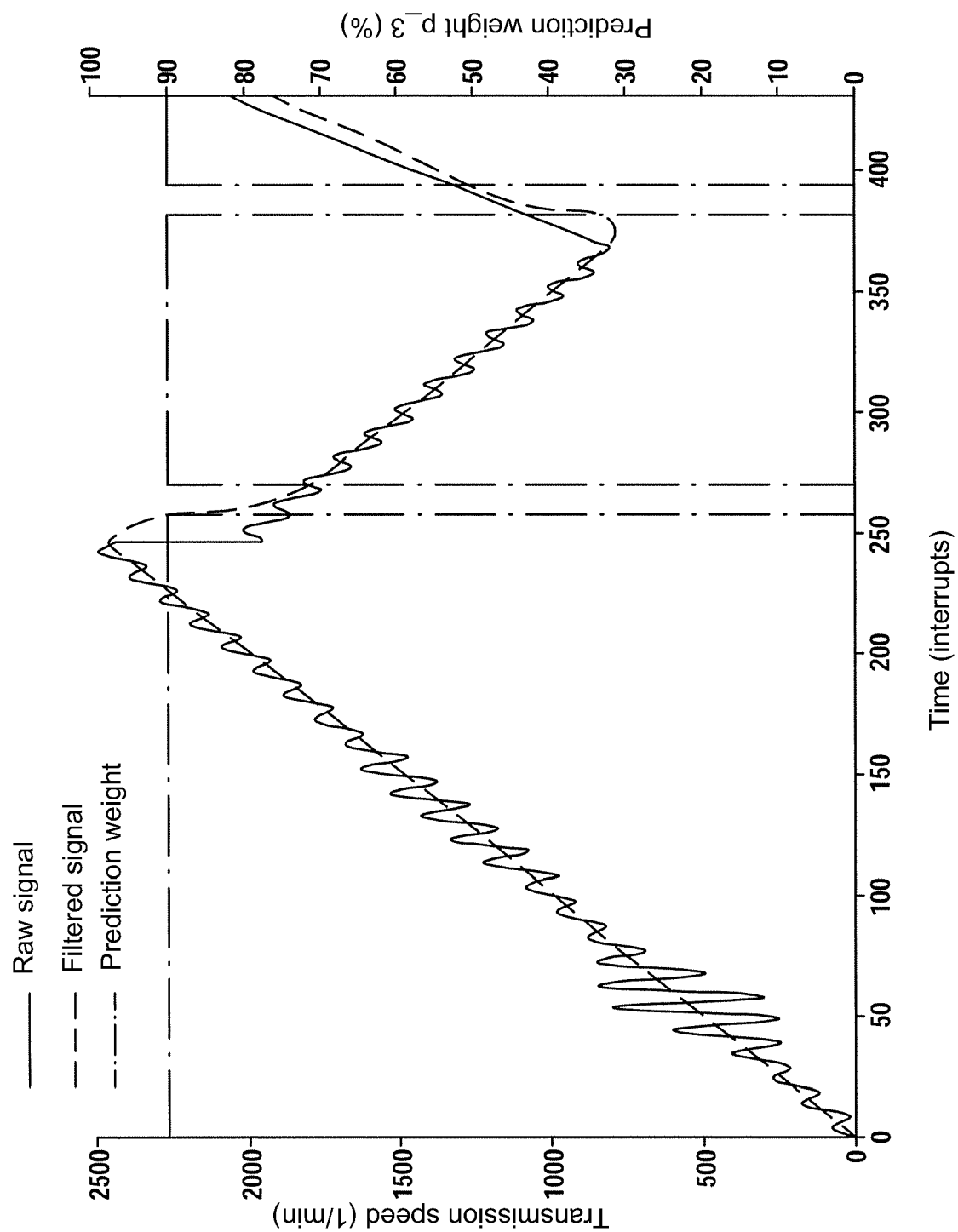

Aspects of filtration according to the invention are illustrated based on FIGS. 3 to 5. Thus, the time is depicted on the X-axis based on fixed incremental interrupt points. The transmission input speed is depicted on the Y-axis.

FIG. 3 depicts filtration of the raw signal n_raw by means of a PT1 filter, wherein an "overshoot" occurs during change in acceleration. The PT1-filtered signal's characteristic is such that it has a large phase angle although a smooth speed curve is obtained. FIG. 4 depicts filtration of the raw signal n_raw likewise with "overshoot" during change in acceleration. A predicted weight or the weighting factor p3 is depicted on the right Y-axis, which is 90[%] in this case. At constant acceleration n_filt delivers a small, constant time delay with regard to raw signals n_raw in process step 78, both through the PT1-filtration of the speed signal from process step 74 as well as through the predicted speed signal (p3>0) from process step 70 as is apparent in the range 0 to about 250 interrupts. In changes of signal derivation, thus under changing acceleration, for instance, owing to undershoot or overshoots during load cycles and gearshifts, admixture of the predicted speed signal (p3>0) causes an "overshoot" of the filtered speed signal n_filt, as is apparent in the range between 250 to about 275 interrupts.

FIG. 5 depicts filtration of the raw signal n_raw with little "overshoot," during change in acceleration. The predicted weight p3 is again depicted on the right Y-axis. In order to circumvent the above-discussed "overshoot", the weighting factor p3 during acceleration changes can be set to zero when the difference between the raw signal and the filtered speed signal exceeds a limit value for a period that is longer than the period T of the chatter frequency to be suppressed in the present gear. This has been done in FIG. 5 in the range between about 260 to 270 interrupts. Without admixture of the predicted speed signal, the speed filter can be reduced to a pure PT1-filter. In comparison with FIG. 4, it is evident that the filtered signal n_filt in FIG. 5 in this range "drops" faster and follows the raw signal in a better manner. Earlier deactivation would prevent suppression of the chatter frequency desired for this gear. The deactivation will be cancelled again after a further period has expired.

Figure 6:
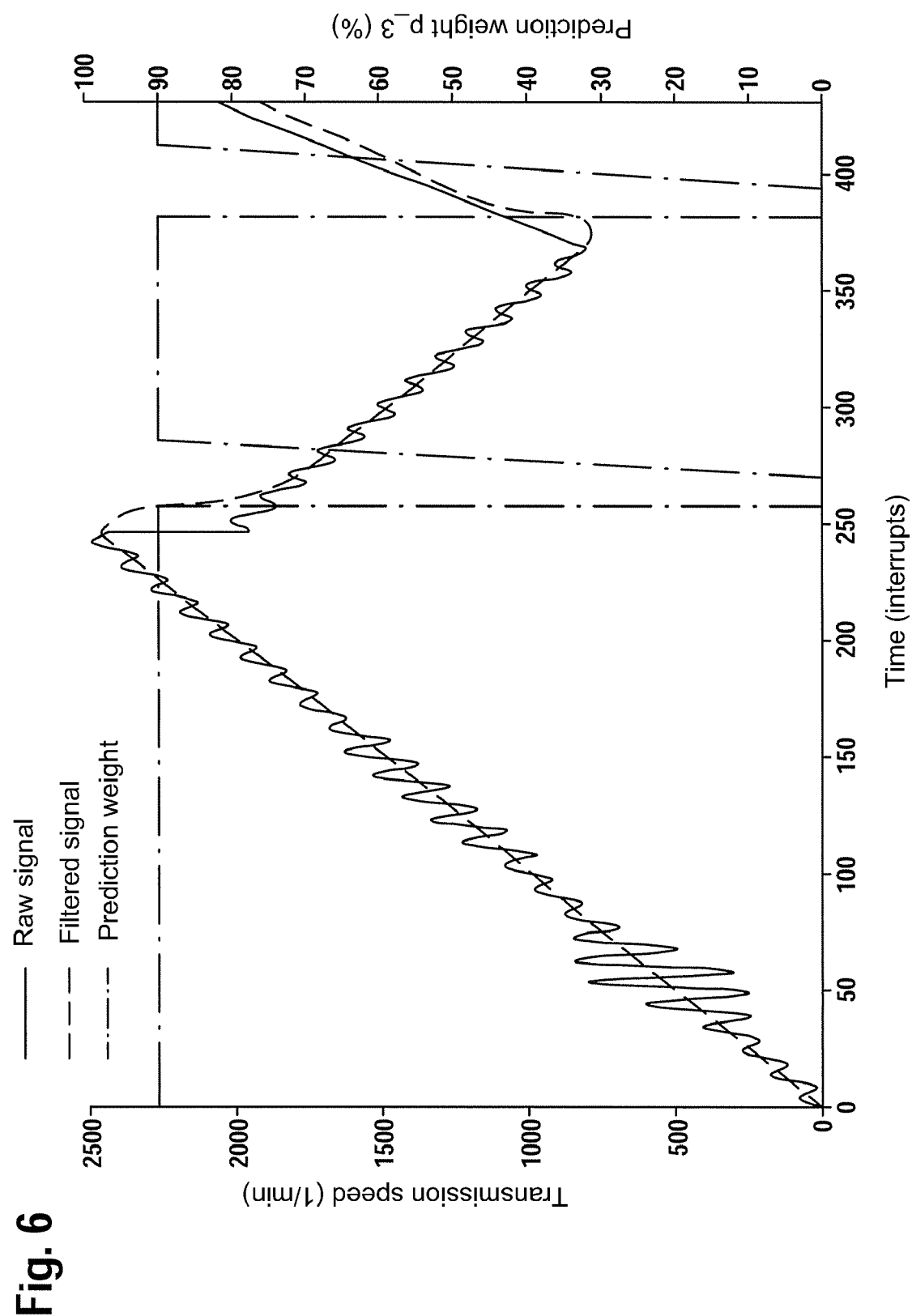

FIG. 6 depicts filtration of the raw signal n_raw with little "overshoot," during change in acceleration. The predicted weight p3 is depicted on the right Y-axis. The predicted admixing can occur abruptly as shown in FIG. 5.

A ramp that raises p3 in each interrupt by a fixed percentage until the original value of p3 is attained again is better suitable. This will be shown in FIG. 6. In particular, the filtered signal n_filt in the region from about 400 interrupts proceeds with a smaller delay than the filtered signal n_filt from FIG. 5 in the same range and after the abruptly predicted admixture.

As explained above based on FIGS. 5 and 6, also a third is fulfilled among the above-mentioned demands.

It is advantageous when the speeds in the previous calculations are considered with an accuracy of 0.1 l/min and the accelerations with an accuracy of 0.01 (l/min)/0.01 s. This is required owing to rounding errors that result from the integration arithmetic. One can proceed with scaling or conversion factors for scaling the speed and accelerations. This is advantageous when one works only with whole numbers, but in order to keep rounding errors small, one or two decimal places must be considered.

A scaling factor f_n for the speed, for example, can be:

$$f\_n=10\cdot(0.1(U\ min)/(U/min)).$$

A scaling factor for the acceleration, for example, can be:

$$f\_n\_dot=100\cdot(0.01(U/min)/(1(U/min)\cdot 0.01\ s)).$$

The described method and apparatus can be changed in a multiple ways. For instance, electronic control device 32 must not be a central control unit; its functions can be distributed in different ways, to control devices and computers available in a vehicle.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE SYMBOLS 10 engine
12 clutch
14 manual-shift transmission
16 cardan shaft
18 differential unit
20 drive shaft with universal joint
22 rear wheels
24 actuator
26 actuating device
28 selection unit
30 accelerator pedal
32 control unit
34 power adjustment element
36 sensor for recording engine speed
38 sensor for recording transmission input speed
40 sensors for recording wheel speed, coolant temperature, position of the power adjustment element, position of clutch etc.
48 flow diagram
50 process step
52 averaging range
54 memory
56 stack memory
58 process step
62 memory
64 process step
66 factor p2
68 memory
70 process step
72 memory
74 process step
76 factor p1
78 process step
80 factor p3
82 memory

What we claim is:

1. A method for controlling the slip of a vehicle clutch, wherein in the method the difference between a speed signal of the drive-end input shaft of the clutch and a filtered speed signal of a transmission-end clutch output shaft are maintained at a desired value, by carrying out the following steps:
   (a) calculating a sliding average value n_ma from a raw signal n_raw corresponding to an instantaneous speed of the transmission-end output shaft of the clutch, of which an averaging range of N interrupts is adapted to a chatter frequency 1/T for a respective gear;
   (b) calculating a derivative of a sliding average value n_dot from the sliding average value n_ma, calculated in a current interrupt, and from a sliding average value n_ma_old, calculated from a previous interrupt;
   (c) calculating a smoothed derivative of a speed signal n_dot_filt with a PT1-filter from the derivative of the sliding average value n_dot calculated in step (b) and from a smoothed derivative of a speed signal n_dot_filt_old calculated in the previous interrupt;
   (d) calculating a predicted speed signal n_pred for the current interrupt from a filtered speed signal n_filt_old calculated in the previous interrupt and from the smoothed derivative of the speed signal n_dot_filt;
   (e) calculating a weighted average value n_PT1 from the raw signal n_raw and the filtered speed signal n_filt_old calculated in the previous interrupt; and
   (f) calculating a filtered speed signal n_filt from a weighted average value n_PT1 and from the predicted speed signal n_pred.

2. The method according to claim 1, wherein the derivative n_dot is calculated according to the following formula: n_dot=(n_ma−n_ma_old)Δt, wherein Δt=T/N.

3. The method according to claim 1, wherein the smoothed derivative n_dot_filt is calculated according to the following formula:

$$n\_dot\_filt=(p2*n\_dot+(100-p2)*n\_dot\_filt\_old)/100;$$

wherein p2 is a weighting factor.

4. The method according to claim 1, wherein the predicted speed signal n_pred is calculated according to the following formula:

$$n\_pred=n\_filt\_old+n\_dot\_filt*\Delta t.$$

5. The method according to claim 1, wherein the weighted average value n_PT1 is calculated according to the following formula:

$$n\_PT1=(p1*n\_raw*f\_n+(100-p1)*n\_filt\_old)/100;$$

wherein p1 is a weighting factor, and $$f\_n = \frac{T}{N}.$$

6. The method according to claim 1, wherein the filtered speed signal n_filt is calculated according to the following formula: n_filt=(p3*n_pred+(100−p3)*n_PT1)/100;
wherein p3 is a weighting factor.

7. The method according to claim 6, wherein weighting factor p3 is set to zero, when the difference between the raw signal n_raw and filtered speed signal n_filt exceeds a limit value for a period longer than the period T of the chatter frequency.

8. The method according to claim 7, wherein after setting weighting factor p3 to zero, the value of weighting factor p3 in each interrupt is raised via a ramp by a fixed amount until an original value of weighting factor p3 is attained again.

9. The method according to claim 1, wherein the speed signal of the drive-end input shaft of the clutch is supplied by an electronic engine control device.

10. An apparatus for controlling the slip of a vehicle clutch, comprising a sensor for generating a raw signal n_raw corresponding to the instantaneous speed of the output shaft and an electronic control device, which features an input connected with the sensor, and a further input on which the speed signal of an input shaft of the clutch is present, wherein the electronic control device controls the slip of the clutch according to the method of claim 1.

* * * * *